United States Patent [19]

Robinson et al.

[11] 4,328,718

[45] May 11, 1982

[54] VARIABLE OSCILLATOR DRIVE MECHANISM

[75] Inventors: Joseph K. Robinson, Bolingbrook; Max Vander Graff, Glenview; Joseph R. De Marais, Bolingbrook, all of Ill.

[73] Assignee: Emerson Electric Co., St. Louis, Mo.

[21] Appl. No.: 181,412

[22] Filed: Aug. 26, 1980

[51] Int. Cl.³ .................... F16H 35/08; F16H 21/44
[52] U.S. Cl. ........................................ 74/833; 74/96
[58] Field of Search ............... 74/828, 831, 833, 834, 74/835, 836, 837, 838, 839, 96

[56] References Cited

U.S. PATENT DOCUMENTS

| | | | |
|---|---|---|---|
| 1,013,076 | 12/1911 | Shank | 74/838 |
| 2,640,425 | 6/1953 | Saalfrank | 74/828 |
| 2,644,385 | 7/1953 | Brown | 74/96 |
| 2,737,896 | 3/1956 | Neyer | 74/834 |
| 3,396,612 | 8/1968 | Lazan | 74/837 |
| 4,261,228 | 4/1981 | Eagan | 74/837 |

FOREIGN PATENT DOCUMENTS 1333242 10/1973 United Kingdom .................. 74/828

*Primary Examiner*—Lawrence J. Staab

*Attorney, Agent, or Firm*—McCaleb, Lucas & Brugman

[57] ABSTRACT

Mechanically-adjustable, variable oscillator drive mechanism having fixed locations for a main input shaft, an intermediate shaft, and an output shaft, and including a crank arm member supported by the intermediate input shaft and intermittently oscillated thereby through a fixed rotation, a slidable drive block member carried within a track formed on the crank arm, a positionally-adjustable carrier bracket mounted on the output shaft and pivotally supporting a sector gear segment, the latter also being drivably supported by the drive block member, and a sector pinion gear segment connected to the output shaft and meshed with the sector gear segment. Adjustment of the carrier bracket and connected sector gear segment, relative to the intermittently oscillating crank arm member, varies the angle of oscillation transferred to the sector gear segment, whereby the oscillation of the driven sector pinion gear segment and connected output shaft is adjustably varied. A combination adjustment and brake locking mechanism is provided to adjustably position the carrier bracket and sector gear segment and to clamp the carrier bracket at the selected operating position.

10 Claims, 11 Drawing Figures

VARIABLE OSCILLATOR DRIVE MECHANISM

BACKGROUND OF THE INVENTION

1. Field of the Invention

This invention relates to oscillating drive mechanisms, and more particularly to an oscillator drive mechanism capable of producing a mechanically varied output.

2. Description of Prior Art

Cam-driven mechanisms are commonly used in industrial applications to provide intermittent drive motion. For example, indexing and oscillating drive devices can be used to index a piecepart between work stations, to intermittently feed sheet material off a supply roll into a punch press, to operate so-called pick-and-place units for transferring workpieces from one station to another, or to mechanically retrieve selected workpieces from a series moving along a conveyor.

Such drive mechanisms utilize cams fabricated from metal or other hard materials which themselves are inherently incapable of adjustment. The output stroke or feed distance of the usual cam-driven apparatus cannot be readily adjusted without a complete changeover of the cam parts or the mechanism's other drive linkages. Thus, there has been a recurring need for an adjustable oscillator drive mechanism that results in a varied output motion while conveniently providing fixed input and output shaft locations.

One prior art attempt to overcome this problem in the context of a punch press feed operation was a gearing mechanism mounted externally of the oscillator drive to change the ultimate linear feed distance. Yet another prior art device provided linear adjustment of the drive mechanism's intermittent output motion, but had a varying output shaft location. Such a variable output shaft location feature presented problems in properly adjusting the drive components of the associated feed equipment. Still another prior art device utilized a harmonic type mechanism having relatively massive component parts which severly limited the obtainable output speeds.

It has become desirable, therefore, to have a variable oscillator drive mechanism that is comprised of lightweight components, that is able to achieve high operational speeds, that is easy to adjust and operate, and which has fixed input and output shaft locations.

SUMMARY OF THE INVENTION

The present invention overcomes these and other prior art problems by providing a variable drive mechanism that has fixed locations for the main input shaft, an intermediate shaft, and a final output shaft. The present invention also has a crank arm that is uniformly oscillated by the intermediate shaft, first and second gear segments that are meshed one to another and are operatively connected to the crank arm and output shaft respectively, and a movable carrier bracket intermediate the two gear segments and pivotally supporting the first gear segment. A novel adjustment and brake locking mechanism is provided to selectively position and lock the carrier bracket in a desired operating position thereby allowing the first gear segment to be adjustable relative to the intermediate shaft.

With the present variable oscillator drive mechanism, adjustment of the first gear segment relative to the crank arm varies the angle of oscillation transferred to the first gear segment. That in turn varies the degree of oscillation transmitted to the second gear segment and thus varies the ultimate output. The present invention can be utilized with various oscillating drive mechanisms, such as those commonly referred to as the parallel shaft type, the right angle shaft type, and the roller gear type oscillator drive, for example.

The variable oscillator drive mechanism of the present invention is capable of being adjusted both when at rest or when in operation. The output shaft's stroke (in degrees of rotation) can be finitely varied which, for example, can allow synchronization of the operation of associated pick-and-place transfer mechanisms. Any rotational output variations provided by the present invention can also be translated through drive linkages or other drive components to produce an adjustable linear feed distance. If desired, the output shaft can be brought to a substantially rest position, i.e. to substantially a zero output oscillation. This feature is advantageous where extremely short workpieces requiring a minimal feed stroke are involved. Lightweight gear segments and other components are utilized to keep the weight of the moving parts to a minimum, thereby allowing high oscillating output speeds to be achieved.

It is a primary object of the present invention to provide a variable oscillator drive mechanism having fixed input and output shaft locations.

It is an additional object to provide adjustable drive components for a variable oscillator drive mechanism that are light in weight such that high output speeds can be achieved.

It is another object of the present invention to provide a variable oscillator drive mechanism having a brake locking mechanism for the adjustable components thereof, so as to prevent any undue vibrations during use.

It is a further object to provide a variable output mechanism for oscillator drive mechanisms which can be directly incorporated into an oscillator drive to form an integral unit, or alternatively, be used as an adapter unit.

It is a still further object of the present invention to provide a mechanically-adjustable mechanism that can be utilized with oscillator drive mechanisms of the so-called parallel, right angle, and roller gear types.

The means by which the foregoing and other objects of the present invention are accomplished and the manner of their accomplishment will be readily understood from the following specification upon reference to the accompanying drawings, in which:

DESCRIPTION OF THE PREFERRED EMBODIMENT

Figure 1:
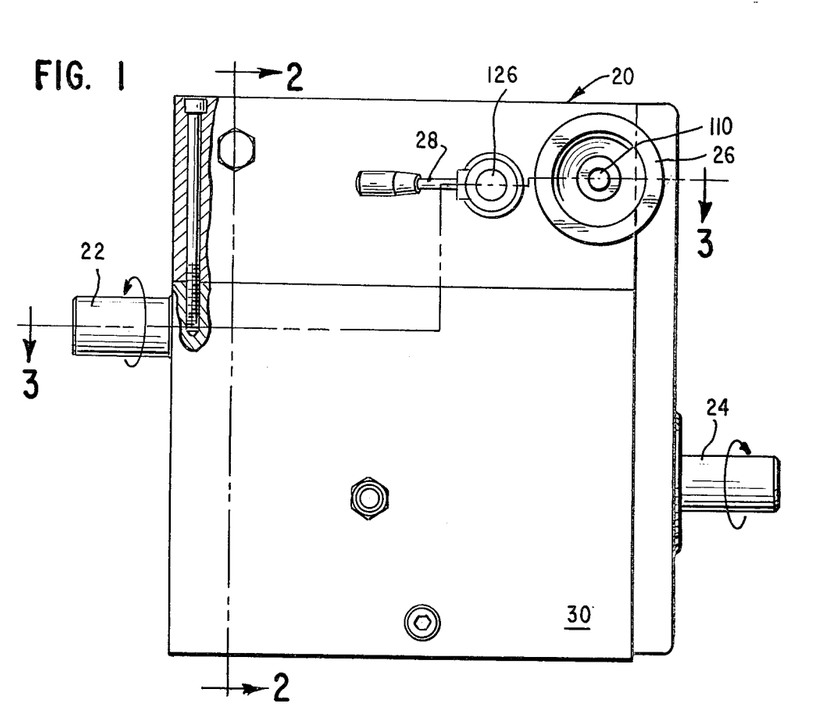
FIG. 1 is an elevation view of the adjustable oscillator drive mechanism of the present invention.

Having reference to the drawings, wherein like reference numerals indicate corresponding elements, there is shown in FIG. 1 an illustration of the variable oscillator drive mechanism of the present invention, generally denoted by reference numeral 20. The preferred embodiment of variable oscillator mechanism 20 is described in relation to a parallel shaft type of oscillator drive (see U.S. Pat. No. 3,525,268 for a description of a typical parallel shaft oscillator). This is because that type oscillator is inherently capable of operating at high rotational output speeds which, depending upon loading, can be in excess of 1000 cycles per minute, for example.

The drive mechanism 20 includes an input shaft 22, an output shaft 24, an adjusting hand wheel 26, and a brake locking handle 28, and is enclosed by a housing 30.

Figure 2:
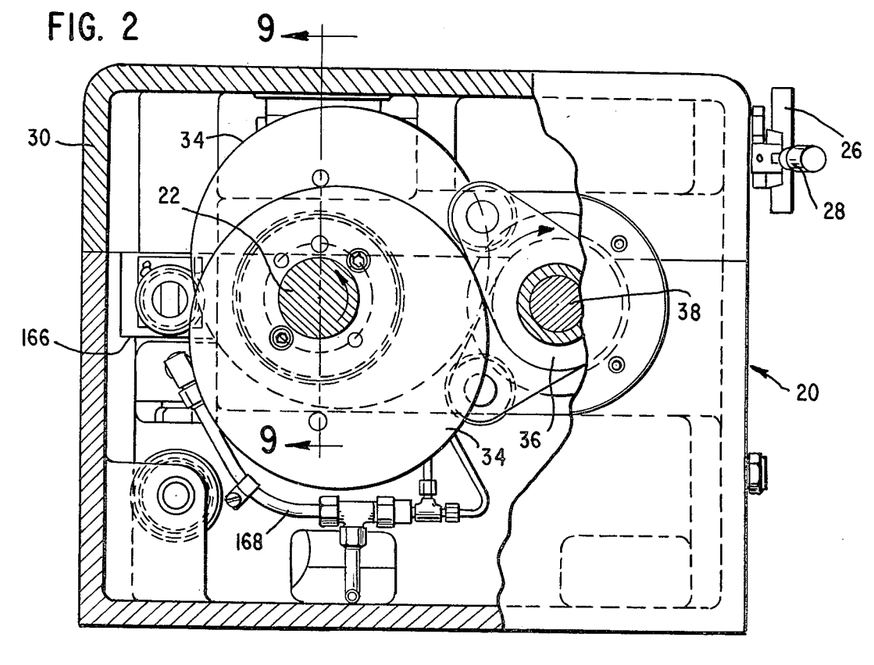
FIG. 2 is a sectional view taken substantially along lines 2—2 of FIG. 1.
Figure 3:
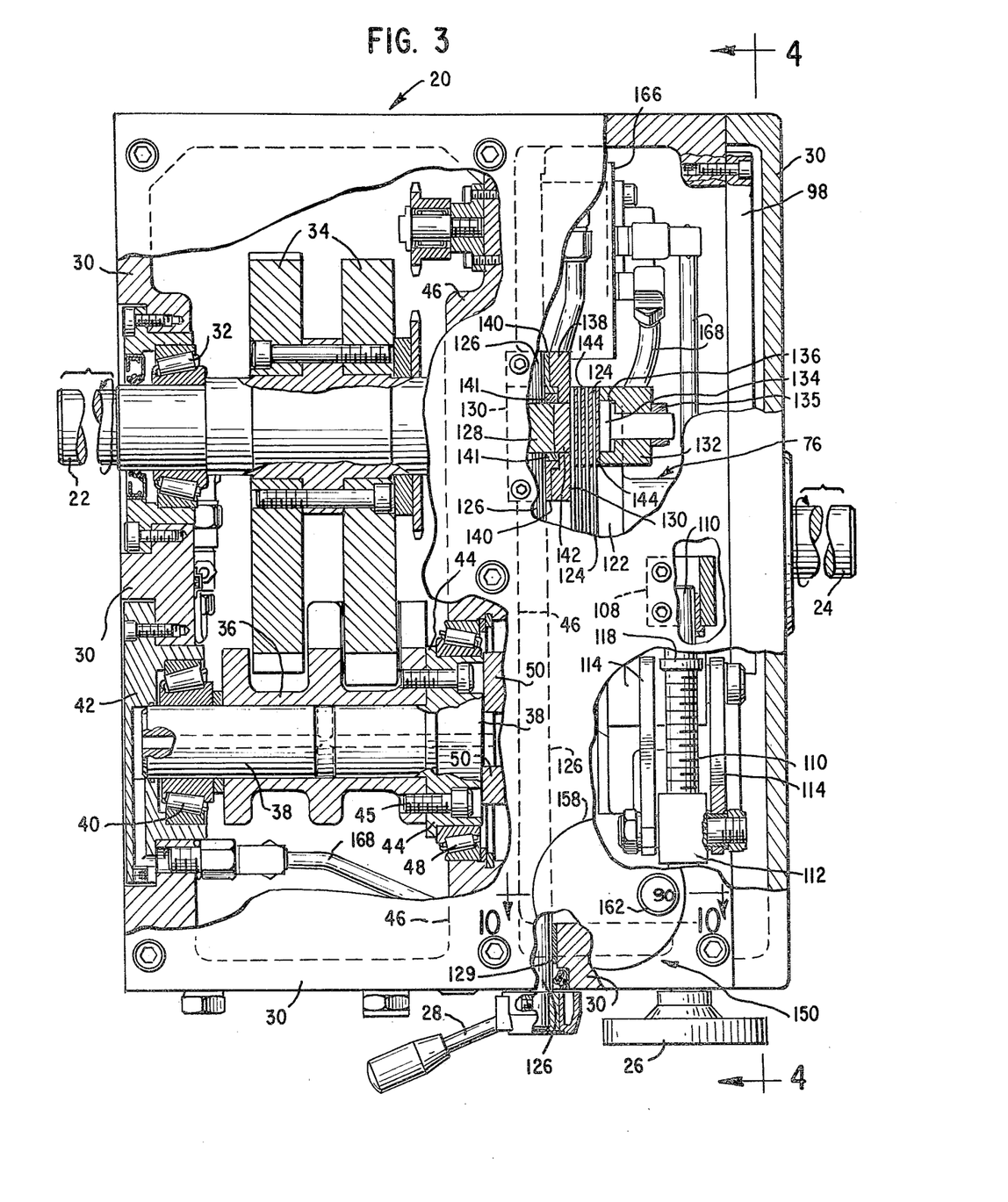
FIG. 3 is an enlarged sectional view taken along lines 3—3 of FIG. 1 with certain parts broken away for better viewing.

As seen in FIGS. 2 and 3, the input shaft 22 is supported upon housing 30 by taper roller bearings 32 and carries a pair of plate cams 34 which drive a cam follower 36. The cam follower 36 is rigidly secured to an intermediate or cam follower shaft 38 which is supported at its left end (FIG. 3) within housing 30 by taper roller bearing 40. A bearing cartridge 42 is fastened to the housing 30 and both supports the bearing 40 and provides pre-load to the same. Formed at the right end (FIG. 3) of intermediate shaft 38 is an enlarged annular shoulder 44 which is supported upon a housing support wall 46 by taper roller bearing 48 and secured to follower 36 by fasteners 45.

The input shaft 22, cam plates 34, follower 36, and cam follower shaft 38 comprise what are the operating components of the well-known parallel shaft type oscillator drive. As noted above, this type oscillator is illustrated in relation to the preferred embodiment of the present variable oscillator drive because of its inherent high output speed capabilities.

Figure 7:
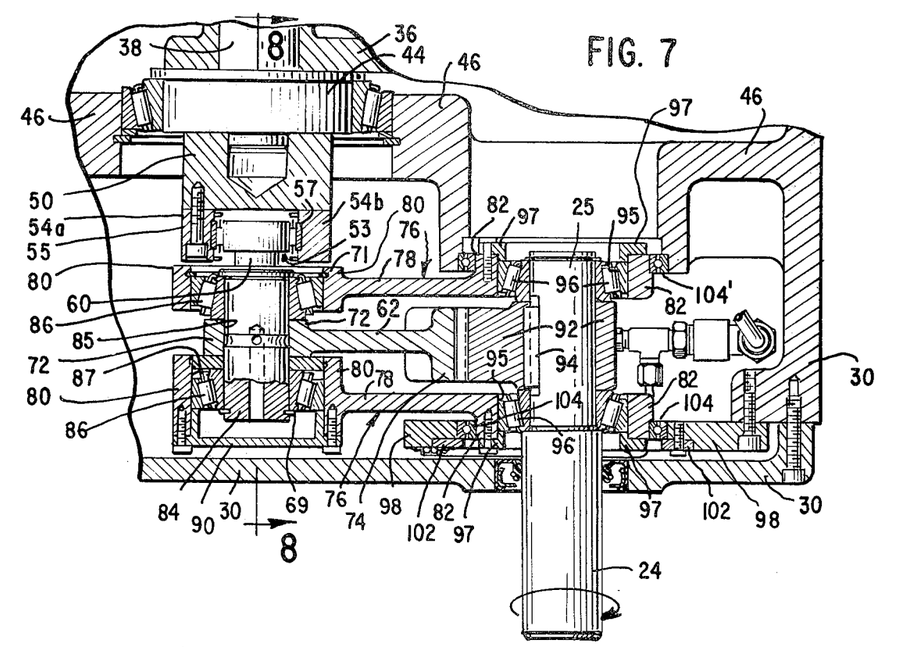
FIG. 7 is a section view of the adjustable components of the present invention taken along line 7—7 of FIG. 4.
Figure 8:
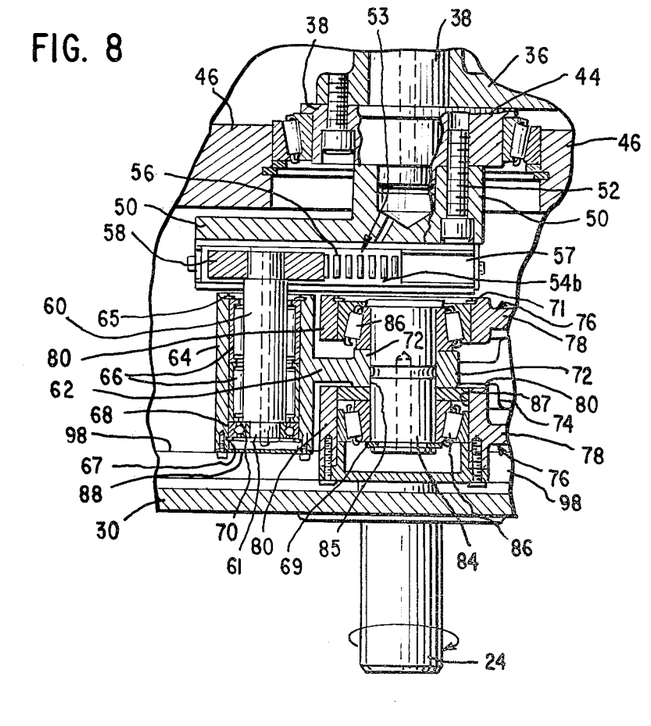
FIG. 8 is a section view of the intermediate shaft and adjustable gear segments of the present invention taken along lines 8—8 of FIG. 7.

As seen in FIGS. 3, 7, and 8, a crank arm 50 is rigidly fastened by threaded fasteners 52 to the enlarged shoulder 44 of intermediate shaft 38. A pair of left and right ways 54a,54b are rigidly secured by threaded fasteners 55 to the crank arm 50 and from a guide track 53 therebetween. Each way 54a,54b includes a carbide bearing surface 57 and a needle bearing race 56. A drive block 58 having a drive shaft extension 60 is slideably supported within the guide track 53 by the needle bearings 56.

A sector gear generally denoted by reference numeral 62 is shown in FIGS. 4 through 8. An enlarged boss 64 of the sector gear 62 pivotally supports the drive shaft 60 by a series of roller bearings 66. A snap type ring 65 is fitted in enlarged boss 64 to retain the roller bearing 66. A ball bearing 68 is fitted over a shoulder 70 on drive shaft 60 and retained by a snap ring 67. The latter prevents any lateral movement of drive shaft 60 within sector gear boss 64. A cover plate 88 secured by threaded fasteners covers off the enlarged boss 64.

A second boss 72 and a gear segment 74 are also formed on the sector gear 62. A carrier bracket generally denoted by reference numeral 76 has a pair of central flanges 78 between which the sector gear 62 is positioned. The carrier bracket 76 also includes a first pair of enlarged bosses 80 formed at one end portion of the central flanges 78 and a second pair of enlarged bosses 82 formed at another end portion of the flanges 78.

A gear pivot shaft 84 is press fit into an opening 85 formed within the sector gear boss 72 (FIGS. 7 and 8). The two outer ends of the gear pivot shaft 84 are pivotally journaled within an opening 87 formed in each of the enlarged bosses 80 of carrier flanges 78 by tapered roller bearings 86. A snap ring 69 is fitted on gear pivot shaft 84 to retain the same against the outer taper roller bearing 86. A carrier bearing retainer 90 is fastened by threaded fasteners and covers off the outer end of gear pivot shaft 84. The retainer 90 together with the snap ring 71 act to pre-load the taper roller bearings 86.

As seen in FIG. 7, the internal end 25 of output shaft 24 has a somewhat reduced diameter. A sector pinion gear 92 is secured to the reduced shaft section 25 by a key 94 whereby the sector pinion 92 and output shaft 24 rotate as one. The reduced shaft section 25 is also rotatably journaled within openings 95 formed in each of the carrier flange bosses 82 by tapered roller bearings 96. A snap-type retainer ring 99 is fitted on reduced output shaft end 25 to retain the same against the interior set of tapered roller bearings 96. Additionally, bearing retainers 97 fastened by appropriate threaded fasteners act to pre-load the taper roller bearings 96. A bearing support plate 98 is secured by appropriate threaded fasteners to the housing 30. An outer carrier pivot bearing 104 supported by the bearing support plate 98 and an inner carrier pivot bearing 104' supported by housing 30 operate to rotatably journal the enlarged bosses 82 of carrier bracket 76. Additionally, a retainer ring 102 fastened by threaded fasteners acts to preload the carrier pivot bearings 104, 104'. It will thus be noted (FIG. 7) that the sector pinion gear 92 is able to oscillate within the space between the carrier bracket flanges 78 and the enlarged bosses 82 thereof.

A carrier bracket positioning and locking mechanism, i.e., control mechanism, is generally denoted by reference numeral 106 and is depicted in FIGS. 3, 4, 5, 6, and 9. The control mechanism 106 includes a screw support block 108 fastened by threaded fasteners to the housing 30, a lead screw 110 supported within both the screw support block 108 and housing 30, and a nut block 112 threaded upon lead screw 110. The lead screw 110 carries the adjustment hand wheel 26 at its outer end. The control mechanism 106 also includes a pair of connecting links 114 each pivotally secured at one end to the nut block 112 and at the other end to an upstanding lug 116. The lug 116 is formed integrally with the carrier bracket 76 along with an elongated, upstanding brake flange 122. A series of arcuate-shaped, thin disc brake members 124 having spacers 125 are rigidly secured to and carried by the brake flange 122.

Figure 4:
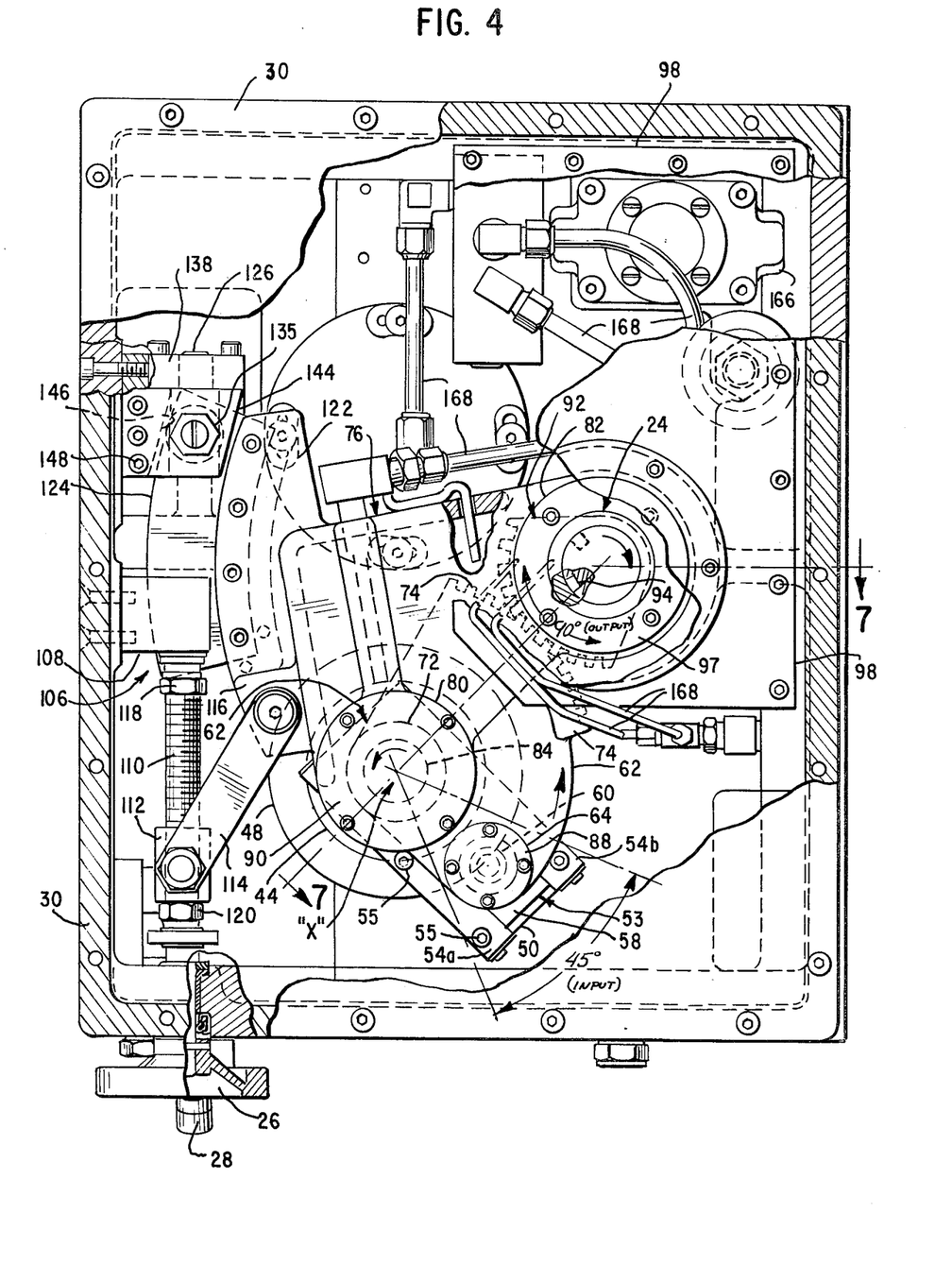
FIG. 4 is an enlarged sectional view taken along lines 4—4 of FIG. 3, and depicting the various components in a maximum output stroke operating position.
Figure 9:
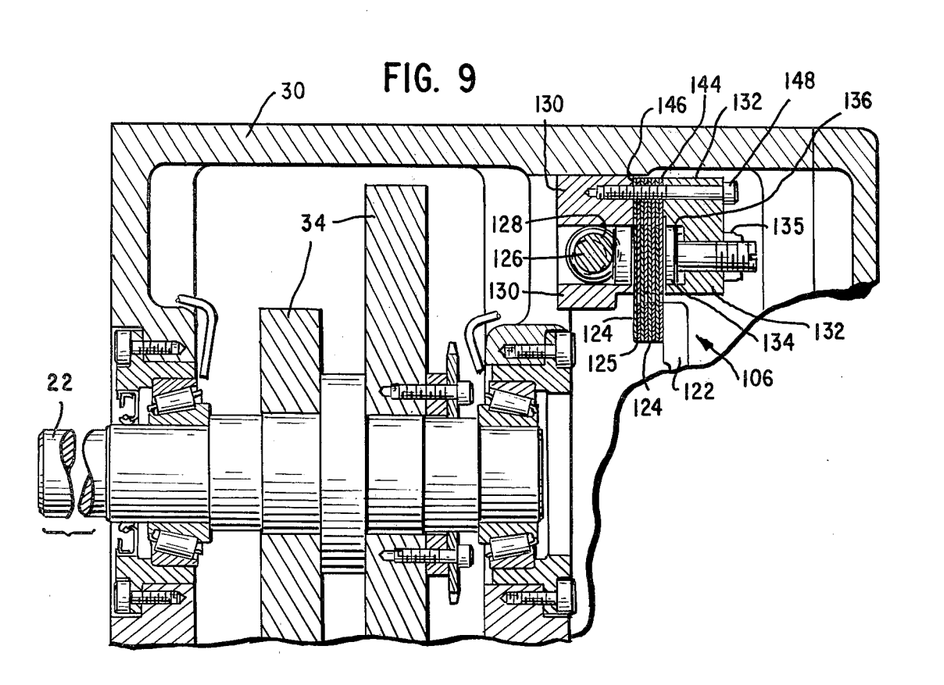
FIG. 9 is a section view of the adjustable positioning and locking components of the present invention taken along lines 9—9 of FIG. 2.

As best seen in FIGS. 3, 4, and 9, the control mechanism 106 also includes an eccentric actuating shaft 126 carrying at its outer end the brake locking handle 28 and at its inner end an eccentric portion 128. A sleeve bearing 129 (FIG. 3) supports the shaft 126 within the housing 30. There are also a stationary left brake housing 130 and a similar right housing 132, both of which are carried by the main housing 30. An adjusting brake pad 134, controlled by a pad adjusting fastener 135, is seated within a shouldered recess 136 on the right brake housing 132. The left brake housing 130 carries a brake support block 138. Thus the eccentric portion 128 of actuating shaft 126 is journalled within the housing 130 and support block 138 by a pair of flange sleeve bearings 140 and a pair of hard wear washers 141 (see FIG. 3). A brake actuating pad 142 is positioned by the left brake housing 130 to seat between the left most disc member 124 (FIG. 3) and the eccentric portion 128 of actuating shaft 126. The plates 124 mate with a series of downwardly-extending brake clamp plates 144 having separating spacers 146 (FIG. 9). The plates 144 and spacers 146 are rigidly secured between the right housing 132 and left housing 130 by threaded fasteners 148.

Figure 10:
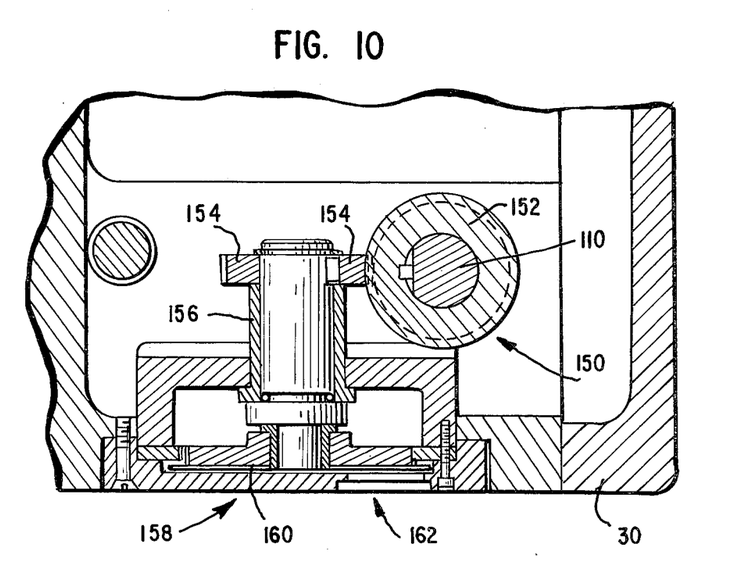
FIG. 10 is a section view of the adjustment indicator mechanism of the present invention taken along lines 10—10 of FIG. 3.

In FIGS. 3 and 10 there is shown a gear-type, position indicator mechanism that is generally denoted by reference numeral 150. The indicator mechanism 150 includes a helical drive gear 152 that is keyed to the lead screw 110 of control mechanism 106. A driven gear 154 is meshed with the helical drive gear 152 and keyed to the inner end of a shaft 156. The shaft 156 extends inwardly from the rear of a rotating indicator mechanism assembly 158 which is mounted within an opening through the top of oscillator housing 30. The indicator assembly 158 includes a position plate 160 that can be viewed through a window 162. The plate 160 includes markings (5°–90°) to indicate the stroke, i.e., output rotation, of output shaft 24. It will be understood that any other well-known type of indicator mechanism can be utilized in place of the indicator mechanism 150, as long as the actual degrees of rotation of the output shaft 24 is indicated.

A force feed type of lubrication system, generally denoted by reference numeral 164, is utilized to supply lubricant to the various operating components of the present invention. The lubrication system 164 has a pump and manifold 166 operating off the input shaft 22 and includes appropriate lubricant feed lines 168. It is to be understood that the specific lubrication system 164 is not essential to the operational concept of the adjustable oscillator drive mechanism of the present invention. Any other well-known lubrication system can be utilized in its place. One alternate type lubricating method could be a splash feed system by which movement of the various operating components would act to splash lubricant from a reservoir up into any necessary points of lubrication. In any event, lubrication is deemed desirable to overcome any so-called "fretting" corrosion of the various roller bearings present, since in the preferred embodiment many bearings will oscillate less than one full revolution.

We turn now to a discussion of the operation of the present invention. Preliminarily, it is to be understood that a variable output oscillation is obtained with the present invention by having fixed locations for the input and output shafts and further having two interconnected oscillating drive segments intermediate those shafts, one of which drive segments is pivotally adjustable about the fixed output shaft. In effect, the positional adjustment of the adjustable drive segment acts to change the radius of rotation through which it is driven, thereby transmitting a variable oscillation to the output shaft. The fact that the adjustable drive segment is adjusted over an arcuate path assures fixed locations for the input and output shafts. In the preferred embodiment, the two interconnected drive segments are a sector gear and a sector pinion gear. In an alternate embodiment, these gears are replaced by drive disk members which are interconnected by a tight band mechanism.

Figures 5, 6:
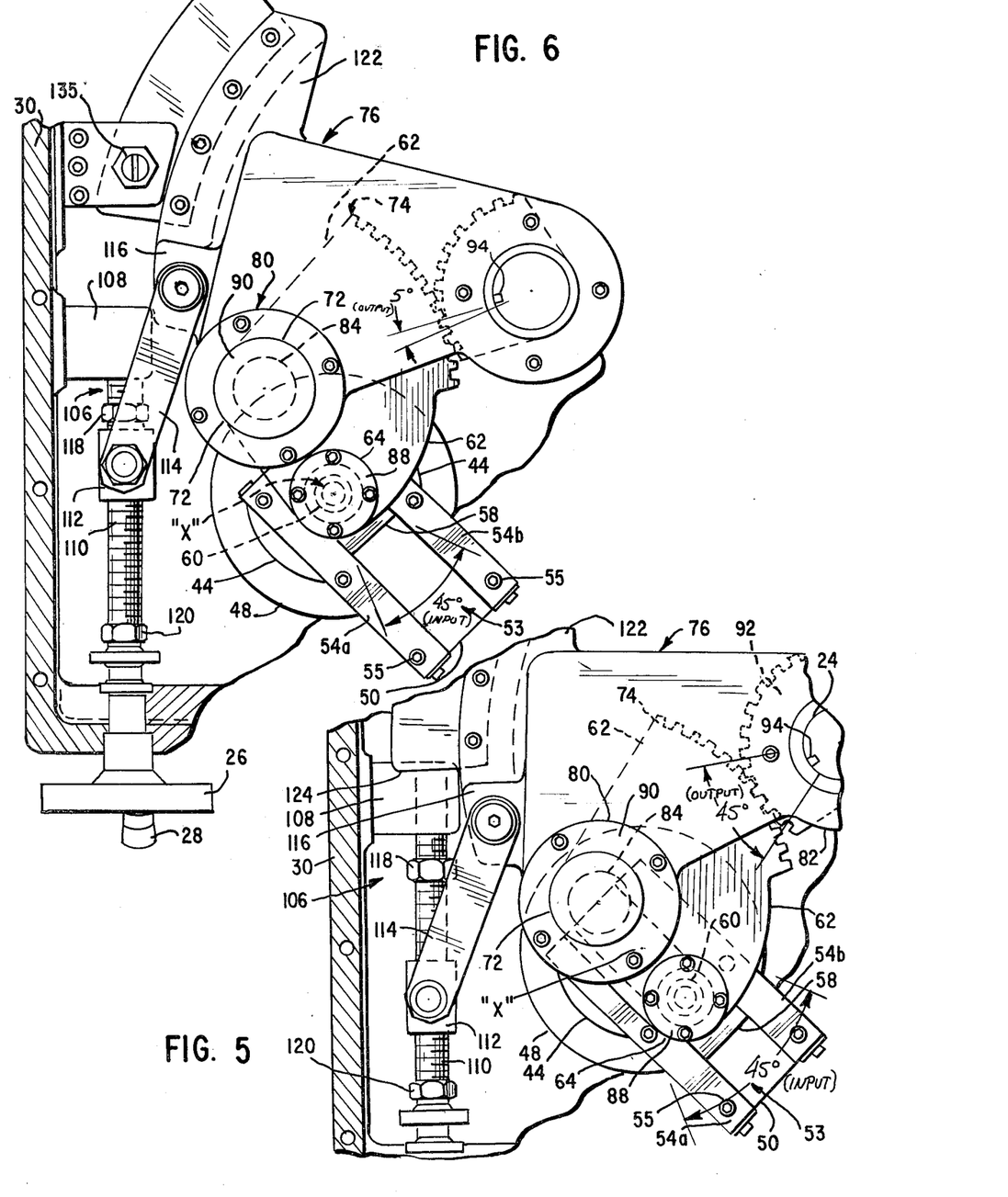
FIG. 5 is a sectional view of the adjustable operating components of the present invention, similar to FIG. 4, but depicting the various drive components in an adjusted, midstroke operating position.
FIG. 6 is another section view of the adjustable operating components, similar to FIG. 4, but showing the drive components in a substantially minimum stroke operating position.

Specifically, through use of a motor (not shown), the input shaft 22 is unidirectionally driven at a constant rotational speed. The plate cams 34 are driven by the input shaft 22 and in turn drive the cam follower 36 and the intermediate shaft 38 connected thereto. This action results in a constant, uniform oscillation of the intermediate shaft 38, its enlarged end 44, and the crank arm 50 connected thereto. As seen in FIGS. 4, 5 and 6 and for purposes of illustration only, the crank arm 50 is shown as being constantly oscillated through a 45° rotation. This constant "input" rotation of crank arm 50 depends solely upon the "output" rotation transmitted by intermediate shaft 38.

As seen in the maximum output position of 90° (FIG. 4), the control mechanism 106 is shown as having been adjusted until the nut block 112 abuts maximum stop nut 120 and the connecting links 114 have placed the carrier bracket 76 in its position as shown. This movement, in turn, locates the axis of gear pivot shaft 84 (connecting the sector gear 62 to the carrier bracket 76) over the axis of the intermediate shaft 38 and its enlarged end 44. Further, this places the drive block 58 (and hence drive shaft 60) at its maximum extended position along ways 54a, 55b, i.e., along guide track 53 of crank arm 50. It will thus be noted that, in effect, the centers of the two gear segments 62 and 92 are linked by the carrier bracket 76. This assures that they remain interconnected, i.e., meshed, during positional adjustments of the moveable gear segment 62, yet allows each to pivot and transmit oscillation.

Accordingly, the constant 45° oscillation of crank arm 50 is transmitted to the drive shaft 60 by drive block 58 which, in this instance, causes the sector gear 62 to oscillate about gear pivot shaft 84 through a fixed 45° rotation. Since in the preferred embodiment, the sector gear 62 (FIG. 4) has twice the radius as that of sector pinion 92, the 45° oscillation of sector gear 62 operates to drive sector pinion 92 and output shaft 24 through a fixed 90° rotation. Thus, FIG. 4 illustrates the maximum output position for the adjustable components of the variable oscillator drive mechanism 20 of the present invention.

Turning now to FIG. 5, there is illustrated mid point position for the various components giving final output rotation of only 45°. To change from the maximum position (FIG. 4) to this mid stroke position (FIG. 5), the brake locking mechanism 28 is first released. That is, movement of the eccentric actuating shaft 126 rotates eccentric portion 128 whereby brake actuating pad 142 removes the clamping force placed upon the various brake plates 124 and clamp plates 144. Rotation of the hand wheel 26 causes lead screw 110 to move out block 112 to a position somewhat centrally located between the maximum stop nut 120 and minimum nut 118 as shown. Additionally, a 45° marking is now visible in the window 162 (FIG. 3). The brake locking mechanism 28 is reactivated to reclamp brake plates 124. Now, the carrier bracket 76 is locked in the position shown in FIG. 5.

Such a repositioning of carrier bracket 76 causes gear pivot shaft 84 to be displaced (in an arc about output shaft 24) which in turn repositions sector gear 62. This action forces a similar arcuate movement of the drive shaft 60 which causes drive block 58 to slide along the guide track 53 until, as shown in FIG. 5, the drive shaft 60 is positioned somewhat centrally therealong. Here the drive shaft 60 and sector gear 62 are driven through a shorter arc by the constantly oscillating crank arm 50 than when positioned as in FIG. 4. Thus, the relocated drive shaft 60 and sector gear 62 move through a reduced oscillation, i.e., approximately 22½° rotation. Accordingly, due to the preferred 2:1 increaser ratio of the gear segments, the output shaft 24 undergoes a 45° output oscillation, as shown.

In FIG. 6 there is shown a minimum output setting where the output shaft 24 undergoes only a 5° oscillation. In the same manner as described above in connection with the mid-point setting of FIG. 5, the brake locking mechanism 28 and control mechanism 106 are operated to move the nut block 112 to a position substantially adjacent minimum stop nut 118. This action causes the carrier bracket 76 to be further pivoted in an arc about output shaft 24 to its new position as shown. This movement causes the gear pivot shaft 84 to reposition sector gear 62 which, in turn, relocates the drive shaft 60 and hence drive block 58. That is, the drive shaft 60 is moved farther up the guide track 53 towards the common axis of rotation (denoted by letter "X" in FIGS. 4, 5, and 6) of crank arm 50 and intermediate shaft end 44. Because in this minimum setting the drive shaft 60 is oscillated by crank arm 50 over an even further reduced arc, the continuous 45° oscillation of crank arm 50 effects only a 2½° oscillation of drive shaft 60. Due to the increaser ratio of the gear segments 62 and 92, this in turn results in a final 5° oscillation of the output shaft 24.

It will be understood that after an adjusting movement by control mechanism 106, the brake mechanism 28 is engaged to assure that the brake plates 124 and clamp plates 124 are clamped together. In other words, the carrier bracket 76 only moves when the control mechanism 106 is being adjusted. This assures that there will be no unwanted movement or pulsation of the carrier bracket 76 or of drive block 58 along guide track 53. The latter would, of course, produce unwanted changes in the selected output rotation of output shaft 24. Those skilled in the art will appreciate that other well-known types of braking systems can be substituted for the mechanical control mechanism 106. These could include a hydraulic or compressed air system, a series of mechanical wedge brakes, or a clamping device operating directly on the lead screw 110, for example. Additionally, in relation to the adjustment of carrier bracket 76, the combination of lead screw 110 and nut block 112 could be replaced by an appropriate worm screw device or other well-known mechanism.

It will be noted that the minimum stop nut 118 is present to assure that the carrier bracket 76 is unable to displace the axis of drive shaft 60 beyond the axis of intermediate shaft end 44 (point "X"). If this were to happen, it would reverse the direction of rotation of output shaft 24. Likewise, the maximum stop nut 120 is present to assure that bracket 76 will not displace shaft 60 beyond a position whereby the output shaft 24 oscillates through any greater than a 90° rotation.

In connection with FIG. 6, it will be understood that if the nut block 112 were to actually abut minimum stop nut 118, the resultant adjustment of carrier bracket 76 would cause the axis of drive shaft 60 to be centered over that of follower shaft end 44, i.e., point "X". Thus, while crank arm 50 would continue to oscillate through its constant 45° rotation, there would be no radius and hence no arc through which drive shaft 60 could oscillate. Hence, shaft 60 would simply rotate on its axis as the crank arm 50 continued to oscillate. Thus, the sector gear 62 would see no movement and there would be no resultant oscillation of the output shaft 24.

Figure 11:
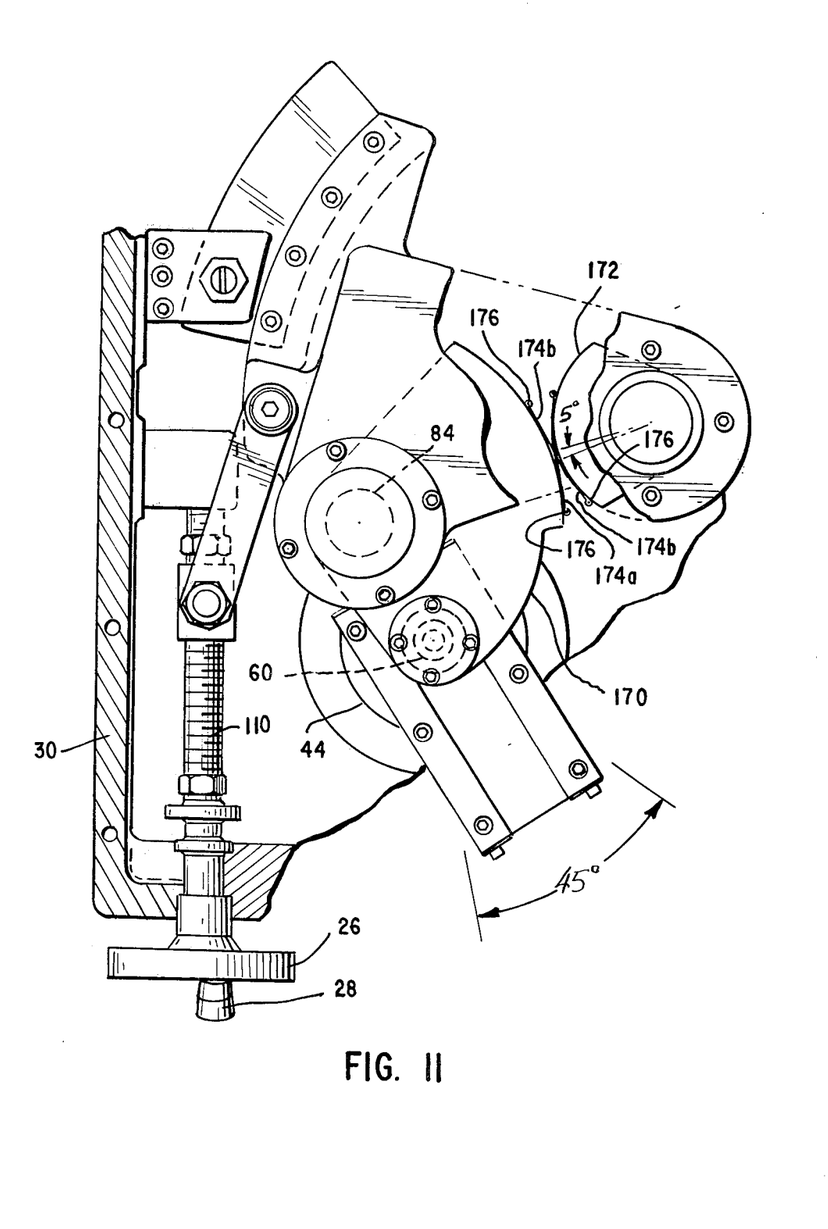
FIG. 11 is a section view similar to FIGS. 5 and 6, but depicting alternate adjustable operating components for the present invention.

One possible modification to the variable drive mechanism 20 is shown in FIG. 11. There the positive drive connection between the output shaft and the positionally adjustable oscillating components is in the form of a so-called tight band connection. That is, the two gear segments 62 and 92 of the preferred embodiment are replaced by two drive disk sections 170, 172. The larger drive disk 170, similar to the sector gear 62, is press fit onto the pivot shaft 84 and also pivotally supports the drive shaft 60. The smaller drive disk 172, again similar to sector pinion gear 92, is keyed to the output shaft 24. A pair of drive bands 174a, 174b are each respectively connected in a criss-crossed manner at one end to the disk 170 and at the other end to disk 172. The bands 174a, 174b are directly connected to disks 170, 172 by well-known adjusting screw-type take-up clamps 176. In this manner, the bands 174a, 174b can be pre-loaded in tension during assembly.

The drive disks 170 and 172 and tight bands 174a, 174b operate in a similar manner to gear segments 62, 92. That is, when the disk 170 is oscillated by the movement of crank arm 50 and drive shaft 60 in one direction, the tensioned band 174a tends to wrap around disk 170 and thus drives or pulls the disk 172 in the other direction. An oppositely directed movement of disk 170 (by opposite oscillation of crank arm 50 and drive shaft 60) causes band 174a to be unwrapped off disk 170 and the bank 174b to be wrapped around the other side of disk 170. This in turn rotates the disk 172 in the opposite direction. It will be understood that, in a well known manner, the bands 174a, 174b are mounted on the drive disks 170, 172 so as not to contact each other in operation. Further, the difference in diameter of drive disks 170, 172 assures the presence of the increaser ratio as found with gear segments 62, 92.

Yet another modification to the present variable oscillator drive mechanism would be to replace the above-described tight band connection with a friction drive connection (not shown). A pair of friction drive disk members could be sufficiently pre-loaded during assembly as to forcefully engage one another. In this manner, any unwanted slippage and resultant timing loss between the friction disks could be eliminated. Such a modified friction drive connection could be used satisfactorily in low torque drive situations. Such friction drive members could be made of a suitable lightweight material, such as aluminum, for example. Yet a further modification would be to replace the above-noted friction drive disks with toothed drive members between which a ribbed timing belt could be used as the positive drive connection.

It will thus be seen that the present variable oscillator drive mechanism provides an adjustable stroke capability for a mechanical oscillator drive. This adjustable stroke can comprise an adjustment of a linear drive distance or the synchronization of associated assembly apparatus, for example. It will be understood that the present variable oscillator drive mechanism can be formed as the integral unit shown as mechanism 20 in the drawings. Alternatively, the invention's variable components, i.e., those components generally located to the right side of housing support wall 46 in FIG. 3 plus the crank arm 50, could be incorporated into a variable output adapter mechanism (not shown) for use with an existing oscillator drive unit. In this later case the crank arm 50 would be rigidly fixed to the output shaft of the existing oscillator unit.

From the foregoing, it is believed that those skilled in the art will readily appreciate the unique features and advantages of the present invention over previous types of oscillator drive mechanisms and adjustable output versions thereof. Further, it is to be understood that while the present invention has been described in relation to particular preferred and alternate embodiments as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

We claim:

1. A variable oscillator drive apparatus comprising in combination:
    an oscillator drive having an input shaft, a cam means, and an intermediate shaft, said intermediate shaft characterized as being oscillated by said cam means through a fixed rotation;
    an output shaft;
    both said input shaft and output shaft characterized as having fixed locations;
    crank arm means mounted on said intermediate shaft;
    carrier means pivotally supported on said output shaft and positionally adjustable thereabout;
    a first drive segment pivotally supported by said carrier member;
    a drive block member slidably mounted on said crank arm means and pivotally connected to said first drive segment; and
    a second drive segment fixed to said output shaft and drivably connected to said first drive segment;
    whereby oscillation of said crank arm means by said intermediate shaft is transferred through said drive block member and said first drive segment to said second drive segment and said output shaft means fixed thereto, and further, a positional adjustment of said carrier member and said first drive segment supported thereby operates to vary the degree of oscillation transmitted to said output shaft.

2. The apparatus of claim 1, and wherein said first drive segment comprises a sector gear and said second drive segment comprises a sector pinion gear.

3. The apparatus of claim 1, and wherein said first drive segment comprises a first drive disk member, said second drive segment comprises a second drive disk member, and tight band means drivably interconnecting said first and second drive disk members.

4. The apparatus of claim 1, and including control means operatively connected to said carrier means for positionally adjusting and releasably locking the same.

5. The apparatus of claim 4, wherein said control means comprises a mechanical brake locking mechanism.

6. The apparatus of claim 4, and indicator means interconnected to said control means and operable to indicate the output stroke of said output shaft means.

7. The apparatus of claim 1, and guide track means formed on said crank arm means for slidably mounting said drive block member.

8. Apparatus for varying the degree of output oscillation of an oscillator drive mechanism of the type having an input shaft, a cam means, and a cam follower shaft, the apparatus comprising in combination:
    crank arm means mounted to the cam follower shaft and oscillated thereby, said crank arm means characterized as having guide track means formed thereon;
    an output shaft;
    carrier bracket means pivotally mounted to said output shaft and positionally adjustable thereabout;
    a first drive means pivotally supported on said carrier bracket means;
    drive block means slidably mounted in said guide track means and having a drive shaft means, said drive shaft means characterized as being pivotally connected to said first drive means; and
    a second drive means interconnected with said first drive means and drivably secured to said output shaft.

9. The apparatus of claim 8, and including control means to effect selective positioning and releasable locking of said carrier bracket means about said output shaft.

10. Apparatus for varying the output of an oscillator drive mechanism of the type having an input shaft, a cam member, and a cam follower shaft drivably oscillated thereby, the apparatus comprising in combination:
    a crank arm member oscillated through a constant rotation by the cam follower shaft and having guide means mounted thereon;
    drive block means mounted to the guide means and being positionally adjustable therealong;
    a first drive means pivotally mounted to said drive block means;
    an output shaft;
    a second drive means mounted to said output shaft and operable to drive the same, said second drive means characterized as being interconnected to said first drive means; and
    carrier means pivotally mounted to said output shaft and positionally adjustable thereabout, said carrier means further characterized as being pivotally connected to said first drive means and operable to maintain said interconnection of said first and second drive means regardless of the positional adjustment of said carrier means about said output shaft;
    whereby positional adjustment of said carrier means operates to reposition said drive block means along said guide means on said constantly oscillating crank arm member thereby changing the degree of oscillation transmitted by said first and second drive means to said output shaft.

* * * * *

UNITED STATES PATENT AND TRADEMARK OFFICE
CERTIFICATE OF CORRECTION

PATENT NO. : 4,328,718
DATED : May 11, 1982
INVENTOR(S) : Joseph K. Robinson et al.

It is certified that error appears in the above—identified patent and that said Letters Patent is hereby corrected as shown below:

Col. 6, line 21, mark which looks like a tiny "b" should be a quotation mark (") before word "output"

Col. 6, line 24, "abutts" should be --abuts--

Col. 6, line 33, "55b" should be --54b--

Col. 6, line 61, "out" should be --nut--

Col. 7, line 41, "124" should be --144--

Col. 7, line 64, after "displace" insert --drive--

Col. 8, line 38, "bank" should be --band--

Signed and Sealed this

Twenty-seventh Day of July 1982

[SEAL]

Attest:

Attesting Officer

GERALD J. MOSSINGHOFF

Commissioner of Patents and Trademarks